United States Patent [19]
Warrington

[11] Patent Number: 5,185,261
[45] Date of Patent: Feb. 9, 1993

[54] TWIN-UNIT COMPOSTING APPARATUS

[76] Inventor: Jack E. Warrington, 36 Alder Road, Toronto, Ontario, Canada, M4B 2Y4

[21] Appl. No.: 726,698

[22] Filed: Jul. 8, 1991

[51] Int. Cl.⁵ .................. B09B 00/00; C12M 1/04; C12M 1/08
[52] U.S. Cl. .................... 435/313; 435/287; 435/314; 422/184
[58] Field of Search ............ 435/313, 314, 315; 422/184

[56] References Cited

U.S. PATENT DOCUMENTS

| | | | |
|---|---|---|---|
| 4,174,371 | 11/1979 | Bell et al. | 422/109 |
| 4,343,907 | 8/1982 | Graefe | 435/313 |
| 4,608,175 | 8/1986 | Nuttle | 210/532.2 |
| 4,798,801 | 1/1989 | Hitzman | 435/313 |
| 4,798,802 | 1/1989 | Ryan | 435/287 |
| 4,956,002 | 9/1990 | Egarian | 71/9 |
| 4,984,561 | 1/1991 | Warrington | 126/417 |
| 4,994,245 | 2/1991 | Murray et al. | 423/238 |

Primary Examiner—Robert J. Warden
Assistant Examiner—T. A. Trembley
Attorney, Agent, or Firm—Ridout & Maybee

[57] ABSTRACT

A composting apparatus is provided comprising two similar units arranged side-by-side each provided with a wire mesh basket structure as its lowermost extremity. The units are installed in a hole in the ground, with the wire baskets underneath and allowing below-ground communication between the composting contents therein. Each unit has an inclined top wall with a radiation transmissive lid therein, air ducts extending upwardly and allowing air ingress into the units through an adjustable opening, and a common exhaust duct with an exhaust fan. A deodorizing filter is provided in the common exhaust duct. The units are insulated to enhance heat retention.

10 Claims, 3 Drawing Sheets

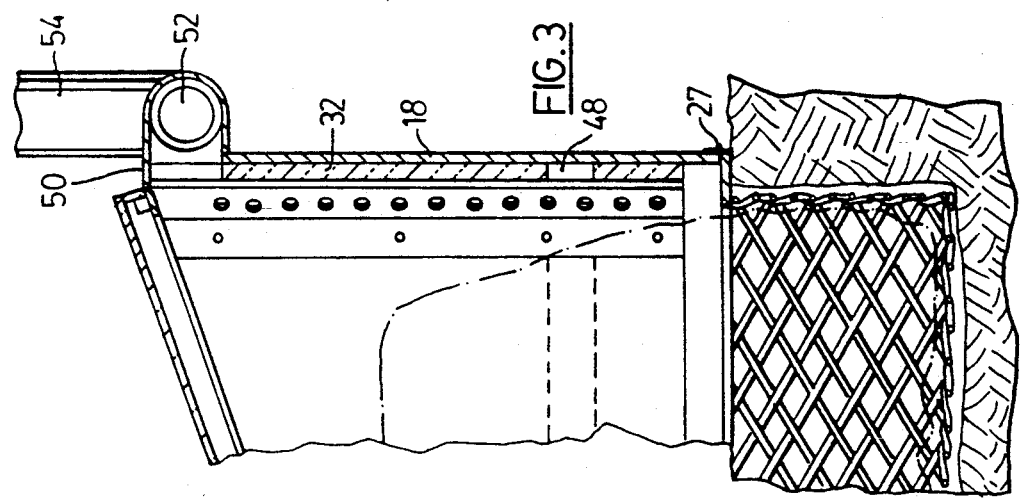
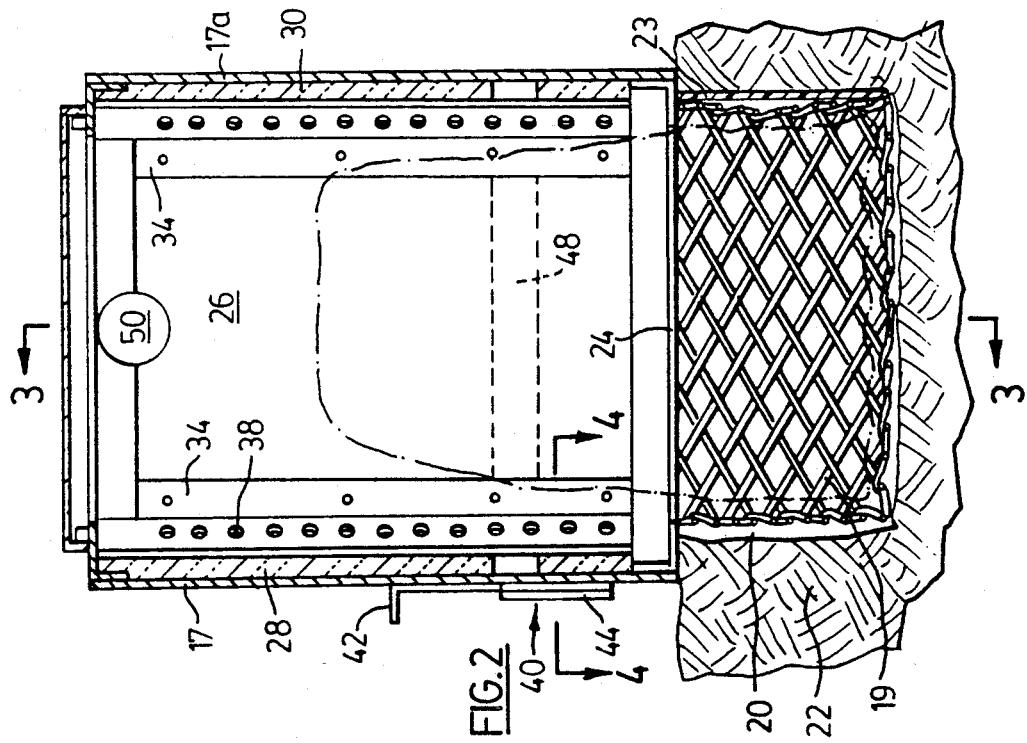

TWIN-UNIT COMPOSTING APPARATUS

FIELD OF THE INVENTION

This invention relates to a composting apparatus, and more particularly to the type of composting apparatus which is to be used on a household, domestic scale.

BACKGROUND OF THE INVENTION AND PRIOR ART

The importance of reducing the quantity of organic wastes discarded by the average household has become recognized more acutely in recent years as waste disposal facilities available to municipalities and other urban districts have become more limited. One of the simplest and cheapest ways to dispose of household organic waste is to allow it to degrade into compost, which can then be incorporated into the soil to enhance the growing characteristics thereof. Indeed, the traditional compost heap is a familiar feature of the yard of any enthusiastic gardener, and provides one outlet for household organic waste disposal.

Disadvantages of the traditional compost heap are, however, well known. They include, among other items, the odor that they exude, the attraction to them of rodents and other pests, and the slow rate of action which they exhibit in reducing organic waste to compost. They operate in a generally uncontrolled environment, open to the elements, so that their operating conditions cannot be optimized to produce best quality compost in the shortest time.

Consequently, various forms of composting apparatus have been proposed and developed, to provide a more controlled and optimized composting environment, and to reduce the problem of odor and pests. One of the more successful of such apparatus is the one sold under the trade name "Green Cone", by Rubbermaid Inc. and described in U.S. Pat. No. 4,984,561, issued Jan. 15, 1991. This comprises a single, generally conical enclosure adapted to be placed in a shallow hole in the earth. The bottom portion of it, which is received in the earth, comprises a wire basket so that contact is made between the contents of the enclosure and the soil containing the necessary microbes required to initiate and continue the composting degradation. The upper, conical portion has a top access lid. When the lid is closed, the apparatus provides a substantially closed environment, to keep in the objectionable odors and to keep out the pests such as rodents, while the composting process proceeds. The temperature rises in the enclosure as the composting process takes place, thereby increasing the rate at which the composting takes place and increasing the rate of throughput of organic waste material.

All types of organic waste are not suitable for mixing together to form a common compostible mixture. Household organic wastes can be divided into two basic types, garden wastes and kitchen food wastes, to which different degradation criteria apply. If, for example, garden wastes and kitchen food wastes are mixed together in a single apparatus such as the aforementioned Green Cone, an unsatisfactory mixture occurs, components of which degrade at widely differing rates. Any attempts to remove from the apparatus compost for application to the growing area of a garden, at any given time, will result in the withdrawal of a mixture of fully degraded, partially degraded and substantially undegraded material, of little use for its intended purpose. The householder needs a plurality of such units, each devoted to the degradation of a single type of organic waste material.

It is an object of the present invention to provide a novel composting apparatus which overcomes or at least reduces one or more of the above-mentioned disadvantages.

SUMMARY OF THE INVENTION

The present invention provides a composting apparatus having two units, each constituting an enclosure one useful for the degradation into compost of one type of organic waste material, e.g. garden wastes, and the other useful for degradation of another type of organic waste material such as kitchen food wastes, which has a substantially different set of degradation characteristics. The two units are interconnected both in a physical apparatus sense to form a combined structure, and in a process sense so that the degradation process taking place in one unit interacts with and enhances the degradation taking place in the other unit.

More specifically, each of the two units has at least one flat, vertical sidewall of similar size and dimensions, so that the two units can be fitted together in abutting, side-by-side or back-to-back relationship. In this way, the two units can be arranged together in the neatest, most space-efficient arrangement, and providing for use of common interconnected parts such as duct work. Each of the units has an upper part defining an enclosure, and a lower portion formed at least in part from a permeable mesh. They are arranged in shallow holes in the earth, so that their permeable mesh portions are effectively buried below ground, and, when properly arranged together as described above, interact with one another through the underneath soil. In this way, the spheres of microbial activity of the two units affect each other in a beneficial manner, to enhance the composting process in progress in each of the separate units. In addition, each unit is insulated, e.g. by providing an inner panel of insulating material lining some or all of the sidewalls, to ensure beneficial operating temperature within each enclosure, and each is provided with appropriate air flow-through arrangements, including an air drawing means to remove substantial amounts of moisture, further to accelerate and generally to enhance the composting process.

BRIEF REFERENCE TO THE DRAWINGS

FIG. 2 is a vertical sectional view of one of the units shown in FIG. 1, i.e. the left hand unit, viewed towards the back wall thereof;

FIG. 3 is a cut-away sectional view along the line 3—3 of FIG. 2;

DESCRIPTION OF THE PREFERRED EMBODIMENTS

Figure 1:
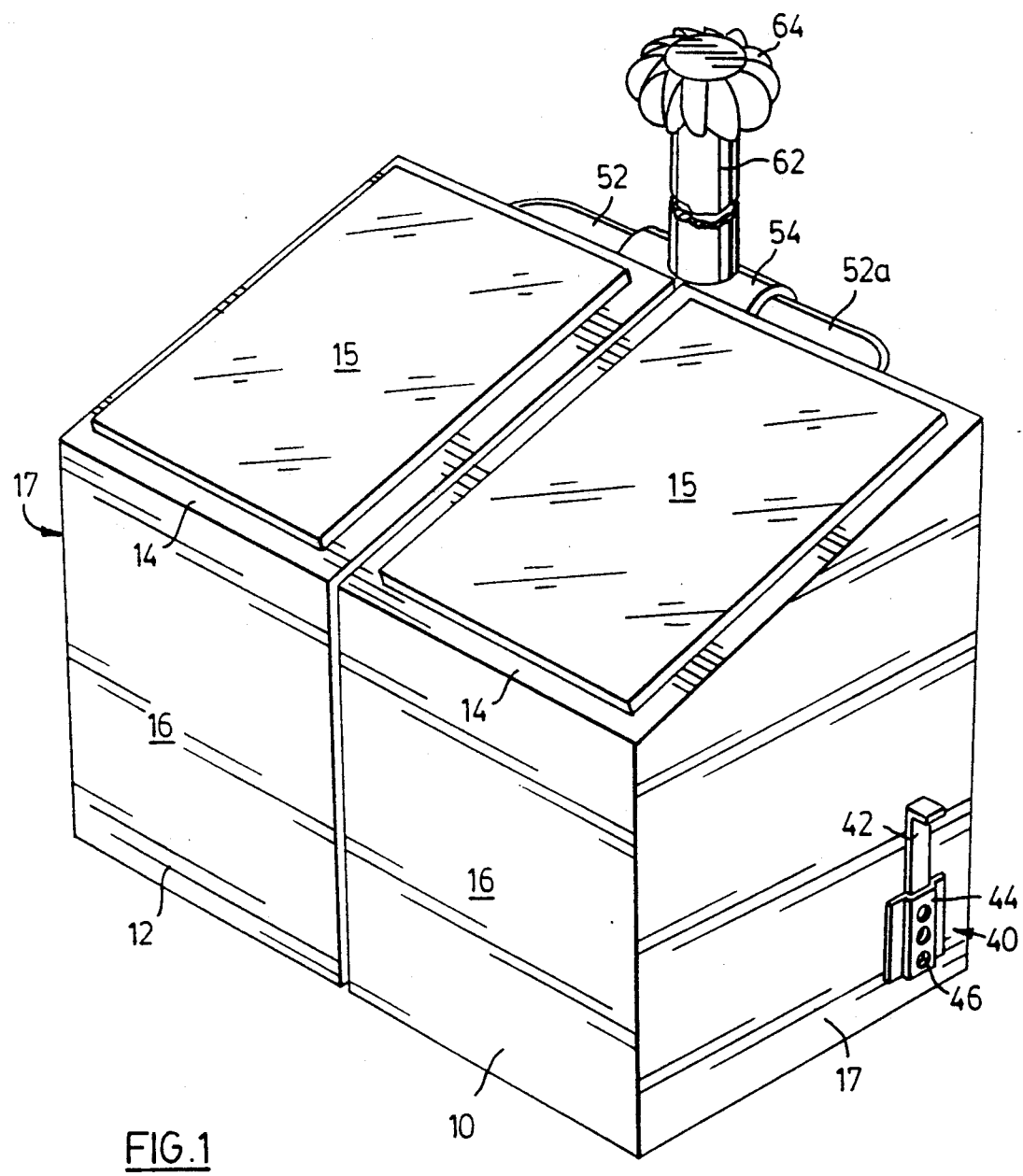
FIG. 1 is a perspective view of the most preferred embodiment of the present invention, with the units shown in full line in a side-by-side relationship.

Preferably the top wall of each enclosure is downwardly inclined, e.g. at an angle of 10°–45°, and has a radiation transmissive panel occupying the major portion of the area of the top wall. By proper orientation of the unit, full utilization of incident solar radiation is made, by units with such inclined top walls, to enhance the temperature rise in the enclosure. Transparent or translucent plastic (polycarbonate, polymethylmethacrylate, etc.) is a suitable material for use as the radiation transmissive lid. The remainder of the body of the unit is suitably made of rigid plastic such as polyethylene or polypropylene, suitably formed.

It is preferred to use a plurality of air conduits in each unit, preferably two, one located in each adjacent corner of the unit, for best air flow through the enclosure formed by the unit. Suitably these are provided by discontinuities in the insulating material, e.g. by making the boundary of the insulating panels short of the corners to provide a conduit up the corners of the unit, and closing the conduit so formed with an inwardly facing, upwardly extending metal plate. This makes for simple and economic manufacture. The plate may be perforated to provide a vent means, for ingress of air into the enclosure.

Suitably also, the two air conduits are interconnected to provide a common inlet to them for outside air. This is conveniently done by providing a generally horizontal discontinuity in the insulation panel of the wall between the two conduits, to act as a communicating channel therebetween. Then, only one air access means, in the form of an aperture through the bottom of the side wall adjacent to a corner thereof, communicating with the bottom of one of the air conduits, needs to be provided. A cover is preferably provided over this aperture, slidably adjustable so as to vary the size of the opening and control the airflow therethrough.

As noted, the units are provided with drawing means, to draw air out from the enclosure to the exterior. Preferably the two units are interconnected with common duct work and a single exhaust fan for this purpose. Thus, at their upper parts, the enclosures are each provided with a branch of an exhaust duct preferably extending generally horizontally along the top part of the back wall, and having openings into each enclosure of the two units. The exhaust duct also includes an upwardly extending chimney containing an exhaust fan, e.g. a wind driven fan, to move air and other vapors, especially water vapor, out of the enclosure to a location well above ground level.

It is found in practice that the composting procedure proceeds at a faster and more satisfactory rate, for both garden wastes and household food wastes, under low moisture conditions. The aeration and exhaust arrangements according to the invention as described above, allow adequate aeration of the composting contents of the enclosure to maintain a suitably elevated composting temperature therein to be maintained, and at the same time allow withdrawal by the exhaust of most water vapor. The insulation on the wall panels, which is chosen from suitably water resistant materials, also helps to maintain suitably elevated composting temperatures, as established by the incident solar radiation and the aerated composting reactions themselves.

To ensure that the unit does not emit odors of degradation when being used at high capacity, it is preferred to include a filter and/or deodorizer in the exhaust ducting. For vapors from garden waste degradation, this can be a series of plates or cloths carrying an aqueous solution such as acetic acid, to counteract ammoniacal vapors. For vapors from food decomposition, plates of absorbent solid such as activated alumina are preferred. The vapors need only flow across and around such plates, not through them, so that the vapor flow is not substantially restricted. The most convenient arrangement is the provision of the filter unit at the junction of the branches of the exhaust ducting.

SPECIFIC DESCRIPTION OF THE MOST PREFERRED EMBODIMENT

With reference to the embodiment of the invention illustrated in the accompanying drawings, in which like reference numerals indicate like parts, FIG. 1 shows the composting apparatus comprising a first unit 10 and a second unit 12 disposed side-by-side, each of generally rectangular horizontal section and each substantially identical. Thus, each unit has an inclined top wall 14 with a hinged, radiation transmissive lid 15 covering the major parts of its area, and providing access to the inside when opened. The vertically extending front wall 16, side walls 17, 17a and back wall 18 are all upright, to provide ease of manufacture and ease of assembly. The back walls 18 of both units are similar in both shape and dimensions, so that they can be arranged in back-to-back relationship with suitable minor rearrangements of parts, although this arrangement is not preferred. The side-by-side arrangements for the units as shown allows both units to be presented at an optimum angle of incidence to prevailing sunlight, and simplifies the interconnecting duct work.

As shown in FIG. 2, each unit has, as lowermost wall, a grid 24 removably secured to it. Below grid 24 is a wire mesh basket 19 which in use is set in a hole 20 of appropriate size and depth, dug into the surrounding earth 22. The grid 24 in practice acts as the top wall of the basket 19, dividing it from the upper enclosure 26 of each unit. The side 23 of each basket next to the adjacent unit is constituted by a solid substantially impervious wall, to limit the transmission of odorous vapors between the units during composting. This is especially desirable when the two units are being used to degrade different types of materials. Degradable material loaded into enclosure 26 through the upper wall 14 and entering basket 19 thus contacts soil of the surrounding earth 22 and the composting microbes therein. Back wall 18 is hingedly connected to the top of basket 19 at 27 (FIG. 3) so that the enclosure 26 can be tipped backwards off the basket 19 for clean out purposes, allowing open access to the basket 19.

Figure 4:
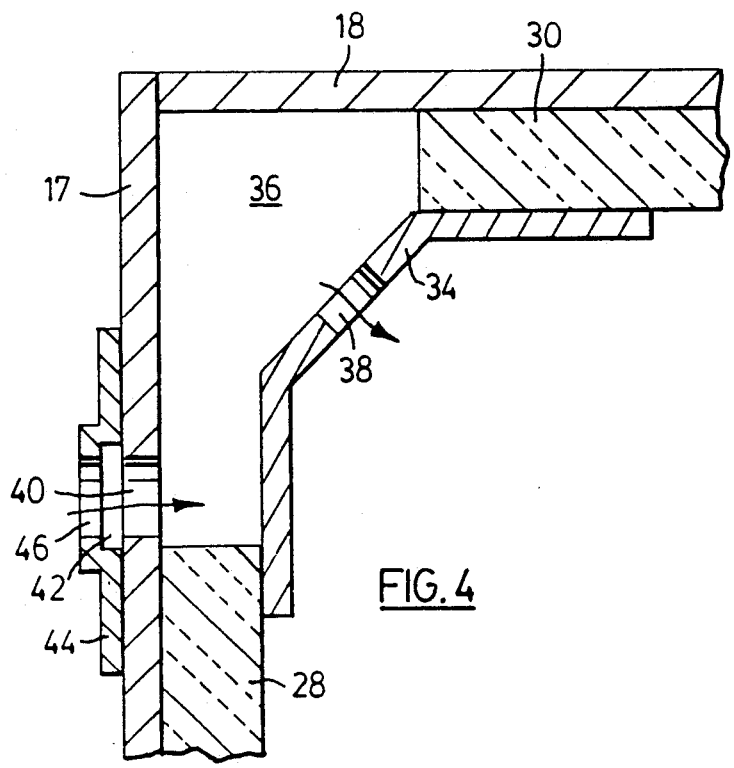
FIG. 4 is a horizontal sectional view of a portion of the unit of FIG. 2, along the lines 4—4 thereof.

Each of the sidewalls 17, 17a of the unit is provided with a panel of insulation 28, 30 as a liner therefor. A similar panel of insulation 32 is provided for the back wall 18 (FIG. 3). As best shown in FIG. 4, the side wall insulation panels 28 and the back wall insulation panel 32 stop short of the corners made between the back wall 18 and the side wall 17, 17a. A plate 34 bridges the gap between the edges of the adjacent insulation panels and extends upwardly to the top of the enclosure thereby forming upwardly extending air conduits 36 in the adjacent corners. The plate 34 has perforations 38 constituting air vents from the conduits into the enclosure.

The side wall 17 of each unit 10, 12 is also provided with an air access means in the form of a hole 40 at its lower, rear part, providing air access to the conduit 36 from outside the unit. The aperture 40 is covered by an adjustable slide 42 provided with apertures, and a guide 44 for the slide provided with similar apertures 46 so that the size of the hole 40 effective to provide air flow into the duct 36 can be adjusted by appropriately adjusting the slide 42.

The back wall insulation panel 32 has a horizontal channel 48 cut therein, extending across its full width, forming a discontinuity to provide an air interconnection between the two ducts 36 in the adjacent corners of the enclosure 26. The channel 48 is open to the interior of the enclosure, to ensure communication between ducts 36 even when the enclosure is largely filled with material to digest.

Figure 5:
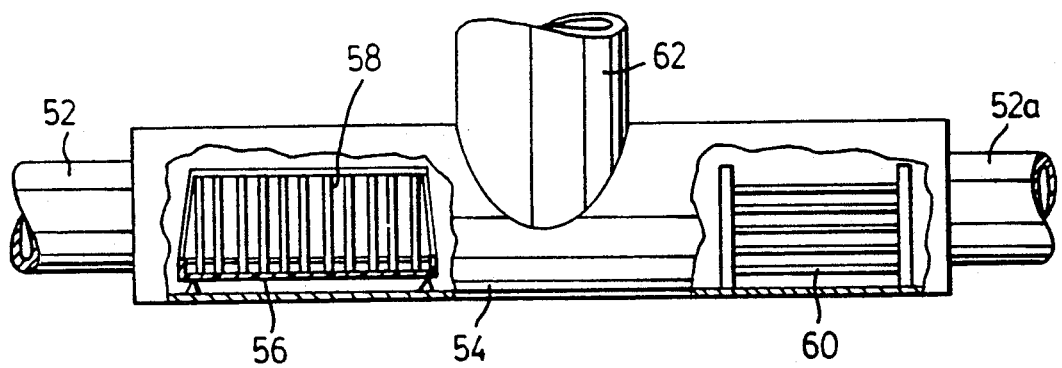
FIG. 5 is a sectional view through the filter unit of the apparatus of FIG. 1.

An exhaust duct branch is provided at the top, approximate center of each enclosure. This duct has a short rearwardly protruding portion 50, 50a from each chamber, and horizontal interconnecting portion 52, 52a for each respective portion 50, 50a. Each portion 52, 52a leads into a filter housing 54, at opposite sides thereof, the filter housing 54 and contents thereof being shown in more detail in FIG. 5. The side of the housing near the inlet from portion 52 contains a horizontally mounted pan 56 containing aqueous acetic acid (vinegar) into which dip a series of felt panels 58 suspended above it. The felt panel 58 becomes saturated with vinegar by capillary action. This arrangement is used in the side of the filter housing receiving gases from a garden composting enclosure. The other side, near the inlet portion 52a, has a series of horizontally disposed plates 60 containing high surface area particulate activated alumina as an odor absorbent for the gases from a food degrading process in the other unit. The plates 60 and panels 58 are held in frameworks so that the gases can flow over and around them, not needing to pass through them, so that gas flow is not significantly obstructed.

A chimney 62 (illustrated in shortened form on FIG. 1 for convenience) extends upwardly from the filter housing 54. The top exit from the chimney 62 is equipped with an exhaust fan 64 in the form of a wind driven rotary fan.

In operation, an appropriate location is chosen for the two units of the apparatus, in a side-by-side relationship, and the exhaust duct work is appropriately connected as shown, through the filter housing 54 to the chimney 62. The hole which is dug is suitably oversized to accommodate both the baskets, in the same hole.

One of the units is then loaded with compostible material in the form of vegetable waste, and the other is loaded with compostible material in the form of kitchen food wastes. In both cases, a heap of compostible material is formed, extending into the baskets 19 below the ground level, contacting the earth surrounding the hole and at the bottom of the hole. There is microbial interaction between the two composting processes through the soil medium surrounding and below the two baskets. If desired, an enzyme containing starter pack can be added to each of the units. The orientation of the units is such that it takes best advantage of the incident sunlight on the inclined top panels. Because different types of compostible material are maintained in each of the two different units, the appropriate enzymatic starter pack can be different for each unit, and can be optimized for the type of material and conditions to be experienced in each of the different units. When the lids 15 are closed, the units are substantially sealed above ground, except for the inlet air vent 40 through which air is drawn rather than expelled, so that the composting proceeds without egress of objectionable odor to any significant extent.

As the composting degradation proceeds, heat is generated in the enclosures, and this is augmented and retained by solar radiation incident on the transmissive lid 21, and the insulation panel largely surrounding the composting material. A generally upward airflow is developed within the enclosure, as a result. This is augmented and assisted by the action of the winddriven exhaust fan 64 at the top of the chimney. As composting proceeds, the heap of material shrinks away from the sidewalls, leaving clearance for air flow through the perforations 38.

As a result, an air flow pattern is established in each unit, whereby air flows in from outside the unit through hole 40 in the lower sidewall of each unit, into the ducts 36, communicating from one duct to the other via channel 48 or around the degrading material when the enclosure is not full. The air exits via perforations 38 from each duct into contact with the composting material within the enclosure, and into the enclosure itself, to exit via exhaust duct 50. As it does so, it draws with it water vapor from within the enclosure, thereby helping to dry the composting mixture so as further to enhance the composting process. The microbial action of composting is largely taking place within the wire basket 19, below ground level, and the composting materials are under influence of each other below ground, so that the microbial reactions interact with one another and enhance the individual composting process in each unit. Otherwise, however, the composting materials are kept separate. The net result is a fast, efficient and convenient composting process in each unit, although at significantly different speeds because of the different nature of the material used in the two units, and the relatively fast throughput of organic waste material in each unit, reduced rapidly to agriculturally useful compost. The deodorizing filter units in filter housing 54 ensure substantially odor-free operation. Fresh compostible material can be added to each unit, while the composting process is still in progress.

In an alternative mode of use, the two units can be used for composting the same type of material, but out of phase with one another. Thus the first unit can be loaded intermittently with garden waste over a period of, say, 14 days, and then closed to complete the composting process over the next 14 days, during which fresh material is added only to the second unit. After this second 14 day period, the second unit is sealed off to complete its composting process, and the first unit is emptied of compost, for agricultural use Then, for the next 14 days, fresh material is added only to the first unit. By operating cyclically with the two units in this way, best quality, useful compost is obtained, in good quantities. In this arrangement, the filter unit 54 may have the same type of filtration or odor-treating component in each side.

In practice, a pair of units of the type illustrated, of height about 30 inches and base about 30 inches square, have been used to degrade 35 pounds per week of food wastes and 100 pounds per week of garden waste (mainly grass clippings), to a highly efficient agriculture compost.

Whilst a specific embodiment of the invention has been described and illustrated in detail, it will be understood that this is for exemplification purposes only, and the invention is by no means limited thereto. The scope of the invention is limited only by the scope of the appended claims, fairly construed.

I claim:

1. A household scale composting apparatus comprising first and second structurally interconnectable units adapted for mutually interactive and cooperative use in reducing organic wastes to compost, the units being essentially similar to one another and each said first and second structurally interconnectable unit having an enclosure for organic wastes, an exhaust duct for said enclosure, and a lower portion protruding downwardly from said enclosure;

each said enclosure comprising:

at least one flat vertical sidewall of similar shape and dimensions to a corresponding sidewall of the other structurally interconnectable unit;

other upstanding sidewalls provided with heat insulation means over a major portion of the area thereof;

a top wall equipped with a hinged, radiation-transmissive lid;

at least one air conduit formed in part by a sidewall of the enclosure and extending upwardly through a major part of the vertical height of the enclosure;

air access means through a sidewall of the enclosure providing for air to be drawn into said at least one air conduit from outside the enclosure;

and vent means providing air communication between said at least one air conduit and the interior of the enclosure;

the exhaust duct being connected to said at least one conduit and including a drawing means adapted to draw air out of the enclosure via the exhaust duct;

and said lower portion comprising a top wall, which also acts as the bottom wall of said enclosure, constituted by a soil permeable mesh and a bottom wall constituted by a soil permeable mesh for soil microbe contact with the material therein, without any interfering barrier between said soil permeable mesh of said bottom wall and the soil.

2. The composting apparatus of claim 1 wherein the top wall of said enclosure is downwardly inclined.

3. The composting apparatus of claim 2 wherein each said structurally interconnectable unit has a plurality of said air conduits, interconnected to provide air communication therebetween.

4. The composting apparatus of claim 3 wherein each said structurally interconnectable unit is generally rectangular as viewed in plan, and said air conduits are disposed in adjacent corners of said structurally interconnectable unit.

5. The composting apparatus of claim 4 wherein said air access means comprises an aperture having means to adjust the size thereof, said aperture providing air communication between air outside the enclosure and all of said air conduits.

6. The composting apparatus of claim 5 wherein said air conduits are defined in part by discontinuities in the heat insulation means and in part by a perforated plate extending between said discontinuities, the perforations therein constituting said vent means.

7. The composting apparatus of claim 6 wherein the air communication between the air conduits is constituted by a discontinuity in the heat insulation means.

8. The composting apparatus of claim 1 further including a filtering and deodorizing means, connected to the exhaust duct.

9. The composting apparatus of claim 1 wherein said drawing means is disposed exteriorly of the units and comprises an exhaust fan constructed and arranged so as to be wind driven.

10. The composting apparatus of claim 1 wherein said exhaust duct has a brunch extending to the enclosure of each structurally interconnectable unit, a filtering and deodorizing means at the junction of said branches, and a single drawing means in the form of an exhaust fan, to draw air simultaneously from the enclosures of both structurally interconnectable units.

* * * * *